Apr. 3, 1923.

B. BANNISTER 1,450,783

PRESSURE REGULATOR

Filed Oct. 8, 1921

Bryant Bannister
INVENTOR.

BY

William B. Wharton
ATTORNEY.

Patented Apr. 3, 1923.

1,450,783

UNITED STATES PATENT OFFICE.

BRYANT BANNISTER, OF PITTSBURGH, PENNSYLVANIA.

PRESSURE REGULATOR.

Application filed October 8, 1921. Serial No. 506,257.

*To all whom it may concern:*

Be it known that I, BRYANT BANNISTER, a citizen of the United States, and resident of Pittsburgh, in the county of Allegheny and State of Pennsylvania, have invented a new and useful Improvement in a Pressure Regulator, of which the following is a specification.

This invention relates to a pressure regulator.

The pressure regulator of the present invention is adapted for use in a line for conducting liquid fuel from a tank to the carbureter employed in conjunction with an internal combustion engine, and has for its purpose the automatic regulation of the pressure under which fuel is delivered to the carbureter.

The specific object of the invention is to provide a pressure regulator arranged to automatically enrich the combustible charge in a carbureter employed in a power propelled vehicle in accordance with increase in the grade up which the vehicle passes, by increasing the pressure under which fuel is delivered to the carbureter; and which will cause a decrease in the pressure under which fuel is delivered when the vehicle is on a downgrade.

A further object of the invention is to provide a pressure regulator, fulfilling the above purpose, which comprises few and simple parts so that it is easy to manufacture and is not apt to become out of order in use.

Figure 1:
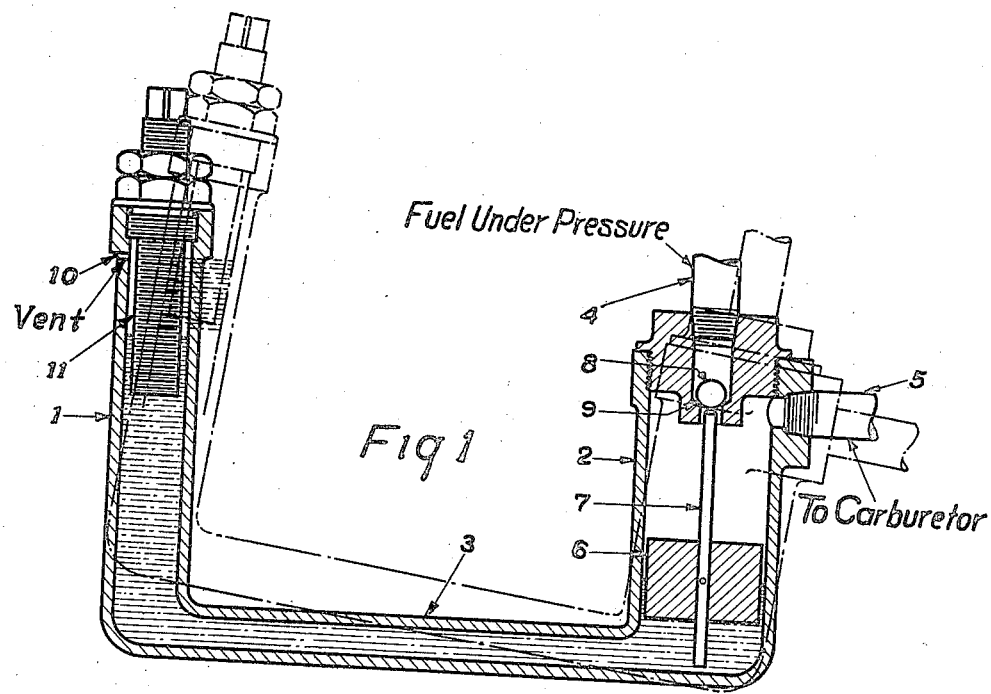
Figure 2:
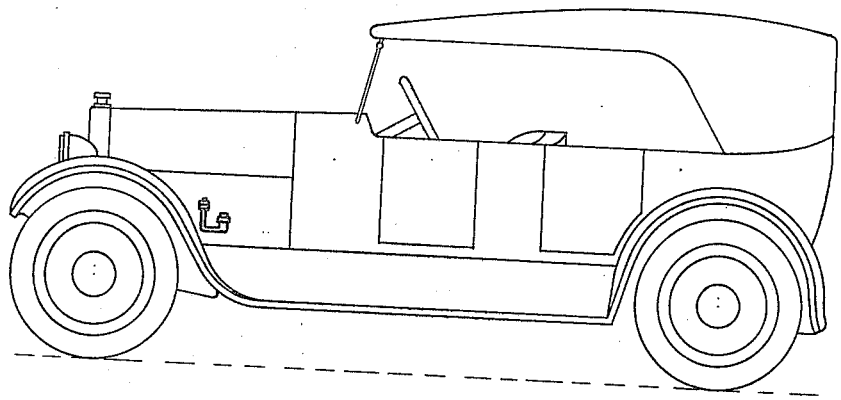

In the accompanying drawings Figure 1 is a central vertical section through the pressure regulator; and Figure 2 is a diagrammatic elevation of a power propelled vehicle showing the pressure regulator in position therein.

The regulator comprises primarily the upright legs 1 and 2, and the conduit 3 connecting these legs. The U-tube contains a suitable fluid, mercury for preference, and is arranged to utilize variations in the relative level of the mercury between the two legs for regulating the pressure under which fuel is delivered to the carbureter of an internal combustion engine. In order to secure the full effect of such variations in fluid level in the legs of the U-tube, such legs are preferably parallel to each other and at right angles to the longitudinal axis of the vehicle in which the regulator is employed.

The leg 2 of the regulator is provided with the inlet connection 4 leading from a source of fuel under pressure and with the outlet connection 5 leading to the carbureter of an internal combustion engine. In the leg 2 is a float 6, which carries a valve stem 7 arranged to lift a ball valve 8 which cooperates with a seat 9 in the fuel inlet passage for controlling the inlet of fuel to the leg 2. The interior of leg 1 of the regulator is preferably in communication with the atmosphere, as by way of a vent 10 located adjacent the upper extremity of this leg.

In use of the device, fuel entering the leg 2 exerts a pressure on the float 6 and the fluid supporting this float, tending to depress the fluid and float and to raise the fluid level in the leg 1; the column of fluid in leg 1 balancing the fuel pressure in the leg 2. The fluid column in leg 1 thus exerts a force tending to cause the float 6 and stem 7 to displace the valve 8 from its seat, and thus maintain the desired fuel pressure in the leg 2 of the regulator. When the vehicle containing the regulator is on a level, with its longitudinal axis normal to the influence of gravity, fuel under the predetermined pressure for such circumstances is delivered through the leg 2 to the outlet connection 5 leading to the carbureter of the internal combustion engine.

When the vehicle containing the regulator is on an upgrade, with its longitudinal axis at an angle to the influence of gravity, the relative fluid level in the legs 1 and 2 will tend to vary in accordance with such angle. As the leg 1 is disposed toward the forward extremity of the vehicle as shown in Figure 2 of the drawings, the fluid level in leg 1 of the U-tube will rise with respect to the level in leg 2, which latter remains practically constant. This variation in the relative fluid levels will produce an increased tendency for the float 6 in leg 2 to rise, thereby permitting and requiring an increase in fuel pressure in leg 2 to prevent such rise.

It will be readily understood that such increase in the presure under which fuel is delivered will be in accordance with the increase in the angle to the influence of gravity at which the regulator is disposed. The regulator is preferably disposed with its legs at right angles to the longitudinal axis of the vehicle in which it is employed, as such positioning secures the maximum variation in relative fluid level with displacement of the longitudinal axis of the vehicle from a position at a right angle to the influence of gravity. It will be understood however, that this effect may be secured to a somewhat lessened degree even though the legs of the regulator are not disposed at right angles to this longitudinal axis.

Conversely when the vehicle containing the regulator is on a downgrade, the pressure under which fuel is delivered will be automatically decreased by the automatic lowering of the fluid level in the leg 1 with respect to the level in leg 2.

In order that the action of the regulator may be predetermined for all positions of the vehicle, the leg 1 of the U-tube is preferably provided with a vertically adjustable plunger 11. When this plunger 11 is lowered into the column of mercury or other fluid in the leg 1, it will obviously raise the level of this column, and when raised, it will cause a corresponding lowering of such level.

The device of the present invention provides in simple form a pressure regulator which automatically regulates the relative pressure under which fuel is delivered in accordance with the disposition of the longitudinal axis of the vehicle in which the regulator is employed. It also provides adjustable means for positively regulating the pressure under which fuel is delivered for any position of the regulator.

What I claim is:

1. A pressure regulator for use in the fuel feed line for the internal combustion engine of a power propelled vehicle comprising a fluid containing U-tube, fuel inlet and outlet connections for one leg of said U-tube, and valve means controlling fuel inlet to said leg and arranged to be operated by the fluid in said leg; said regulator being so arranged that the relative fluid level in said legs will vary in accordance with the disposition of the longitudinal axis of the vehicle.

2. A pressure regulator for use in the fuel feed line for the internal combustion engine of a power propelled vehicle comprising a fluid containing U-tube, fuel inlet and outlet connections for one leg of said U-tube, a float in said leg, and valve means operated by said float for controlling the fuel inlet to said leg; said regulator being so arranged that the relative fluid level in said legs will vary in accordance with the disposition of the longitudinal axis of the vehicle.

3. A pressure regulator for use in the fuel feed line for the internal combustion engine of a power propelled vehicle comprising a fluid containing U-tube, one leg of said tube being subject to atmospheric pressure and the other leg thereof to a source of fuel under pressure; a float in said last named leg, and valve means operated by said float for regulating the inlet of fuel to said leg; said regulator being so arranged that the relative fluid level in said legs will vary in accordance with the disposition of the longitudinal axis of the vehicle.

4. A pressure regulator for use in the fuel feed line for the internal combustion engine of a power propelled vehicle comprising a fluid containing U-tube having legs disposed at substantially right angles to the longitudinal axis of the vehicle, fuel inlet and outlet connections for one leg of said U-tube, and valve means arranged to be operated by variations of the relative fluid level in said legs for controlling fuel inlet.

5. A pressure regulator for use in the fuel feed line of an internal combustion engine comprising a fluid containing U-tube, adjustable means in one leg of said U-tube for varying the fluid level therein, fuel inlet and outlet connections for the other leg of said U-tube, and valve means arranged to be operated by variations of the relative fluid level in said legs for controlling fuel inlet.

6. A pressure regulator for use in the fuel feed line for the internal combustion engine of a power propelled vehicle comprising a fluid containing U-tube, adjustable means in one leg of said U-tube for varying the fluid level therein, fuel inlet and outlet connections for the other leg of said U-tube, and valve means arranged to be operated by variations of the relative fluid level in said legs for controlling fuel inlet to said leg; said regulator being so arranged that the relative fluid level in said legs will vary in accordance with the disposition of the longitudinal axis of the vehicle.

7. A pressure regulator for use in the fuel feed line for the internal combustion engine of a power propelled vehicle comprising a fluid containing U-tube, adjustable means for varying the fluid level in one leg of said U-tube, fuel inlet and outlet connections for the other leg of said U-tube, a float in said leg, and valve means operated by said float for controlling fuel inlet; said regulator being so arranged that the relative fluid level in said legs will vary in accordance with the disposition of the longitudinal axis of the vehicle.

8. A pressure regulator for use in the fuel feed line for the internal combustion engine of a power propelled vehicle comprising a fluid containing U-tube, one leg of said tube being subject to atmospheric pressure and the other leg to a source of liquid fuel under pressure, adjustable means for varying the fluid level in the leg subject to atmospheric pressure, a float in the fuel receiving leg, and valve means operated by said float for regulating the inlet of fuel to said leg; said regulator being so arranged that the relative fluid level in said legs will vary in accordance with the disposition of the longitudinal axis of the vehicle.

9. A pressure regulator for use in the fuel feed line for the internal combustion engine of a power propelled vehicle comprising a fluid containing U-tube having legs disposed at substantially right angles to the longitudinal axis of the vehicle, adjustable means for varying the fluid level in one leg of said U-tube, fuel inlet and outlet connections for the other of said legs, and valve means arranged to be operated by variations of the relative fluid level in said legs for controlling fuel inlet.

In witness whereof, I hereunto set my hand.

BRYANT BANNISTER.

Witnesses:
W. E. BALLARD,
E. B. WALTERS.